United States Patent
Mæland et al.

(10) Patent No.: US 7,614,894 B2
(45) Date of Patent: Nov. 10, 2009

(54) PLUG-IN TERMINATION OF A POWER CABLE FOR SUBSEA APPLIANCES

(75) Inventors: Elin Mæland, Oslo (NO); Gunnar Hafskjold, Drammen (NO)

(73) Assignee: Vetco Gray Scandinavia AS, Sandvika (NO)

( * ) Notice: Subject to any disclaimer, the term of this patent is extended or adjusted under 35 U.S.C. 154(b) by 0 days.

(21) Appl. No.: 12/280,965

(22) PCT Filed: Feb. 26, 2007

(86) PCT No.: PCT/IB2007/000446

§ 371 (c)(1),
(2), (4) Date: Aug. 27, 2008

(87) PCT Pub. No.: WO2007/096760

PCT Pub. Date: Aug. 30, 2007

(65) Prior Publication Data

US 2009/0042437 A1    Feb. 12, 2009

(51) Int. Cl.
    *H01R 4/60*    (2006.01)
(52) U.S. Cl. .................................. 439/201; 439/272
(58) Field of Classification Search ............... 439/201, 439/272
    See application file for complete search history.

(56) References Cited

U.S. PATENT DOCUMENTS

| | | | |
|---|---|---|---|
| 3,980,369 A * | 9/1976 | Panek .......................... | 439/204 |
| 4,859,196 A * | 8/1989 | Durando et al. ............. | 439/197 |
| 4,940,416 A | 7/1990 | Wagaman et al. | |
| 5,209,673 A * | 5/1993 | Mohn et al. .................. | 439/199 |
| 6,482,036 B1 | 11/2002 | Broussard | |
| 6,832,924 B2 * | 12/2004 | Maletzki et al. ............. | 439/201 |
| 6,916,193 B2 * | 7/2005 | Varreng et al. ............... | 439/201 |
| 7,097,515 B2 * | 8/2006 | Siddiqi et al. ............... | 439/700 |

FOREIGN PATENT DOCUMENTS

WO    WO-9934495 A1    7/1999

OTHER PUBLICATIONS

PCT/ISA/210—International Search Report—Jun. 4, 2007.
PCT/IPEA/409—International Preliminary Report on Patentability—Apr. 3, 2008.

* cited by examiner

*Primary Examiner*—Truc T Nguyen
(74) *Attorney, Agent, or Firm*—Venable LLP; Eric J. Franklin

(57) ABSTRACT

A plug-in termination of a single-phase conductor in a power cable termination assembly for submerged use. A first barrier separates an outer pressure-compensated housing from the sea. A second barrier separates an inner pressure-compensated housing from the outer pressure-compensated housing. The single-phase conductor runs through the first and second barriers and is secured in the inner pressure-compensated housing by its end being terminated within an insulator body insertable into the inner housing. The unsheathed conductor end is electrically connected within the insulator body to a conducting pin which is fixedly embedded by molding into the insulator body.

21 Claims, 3 Drawing Sheets

PLUG-IN TERMINATION OF A POWER CABLE FOR SUBSEA APPLIANCES

CROSS-REFERENCE TO RELATED APPLICATIONS

This application claims priority to Norwegian patent application 20060951 filed 27 Feb. 2006 and is the national phase under 35 U.S.C. § 371 of PCT/IB2007/000446 filed 26 Feb. 2007.

TECHNICAL FIELD

The present invention relates to arrangements in power cable termination assemblies for submerged appliances, and in particular to a connector by which electrical power supplied via one or more single-phase conductors is conducted to electrically operated underwater appliances.

BACKGROUND AND PRIOR ART

In sub-sea production, e.g., electrically operated apparatuses on sea floor are supplied power from sea- or land-based host facilities via an umbilical. AC-voltage is conducted via one or more single-phase conductors to submerged process control equipment, pumping and compression equipment, transformers and motors etc., controlling the production for example via valves and actuators on Christmas trees that sit on gas or oil wells and govern the extraction and injection of gas and liquids. Electrical power is connected into the sub-sea equipment via sub-sea connectors, arranged to establish connection and to conduct power from the power cables into transformers, motors, switchgears, VSDs, etc.

In sub-merged applications it is for several reasons indispensable that the cable termination and lead-through of conductors is protected from ingress of water. Considerable pressures prevailing at operational water depths down to and below 1,000 m necessitates a structure that is adapted to existing nominal pressures and differential pressures over seals included in the cable termination assembly. Electrical appliances and power cable terminations for sub-sea use are thus usually enclosed in housings that are filled with a dielectric and incompressible medium, such as oil, in order to withstand the ambient pressure from the sea. Compensation for pressure variations and pressure differences between the housing interior and exterior is called for, and may be facilitated through expandable communicating vessels, e.g., arranged on the housing interior and communicating with the housing exterior.

The power demand of the sub-sea appliances referred to is satisfied through the conduction of high and medium voltage AC-current through power cables typically comprising a central conductor including copper or aluminum surrounded by a solid insulator of cross-linked polyethylene. Additional layers of conductive or semi-conductive screens and insulating layers are usually arranged about the conducting core, all covered by an outer insulating cover such as a polyethylene sheath. A power cable in sub-sea applications may be dimensioned for conducting voltages in the order of up to and above 100 kV over substantial distances in the sea, having a conductor cross-sectional area adapted for current ratings of several hundreds of amperes, such as a conductor section of 25-2500 $mm^2$, e.g., with a capacity ranging to 3000 A. Considering the operational depths, power cables for sub-sea use also need to be designed to withstand substantial external hydrostatic pressures so as to prevent the ingress of water into the cable structure. A single-phase conductor is shown schematically in FIG. 2 of the drawings attached hereto, comprising a conductive core C, a solid insulator P, an outer sheath S, and appropriate additional layers according to current praxis not further illustrated.

The termination of a power cable for submerged use is designed for establishing electrical contact with power consumers or power suppliers in a liquid-insulated environment. In connecting mode the cable termination penetrates into a connection chamber filled with dielectric liquid and housing a contact that mates with the plugged-in cable termination.

Liquid is conventionally used for insulation of the unsheathed conductor in high and medium voltage cable terminations above sea level, alone or in combination with solid dielectric materials. Beside the risk of leakage of dielectric liquid, a liquid insulated cable termination system in a sub-sea application is more vulnerable to ingress of water and provides less protection against over potentials and partial discharge, than a system relying on correspondingly sized solid insulators, e.g. Also, heat expansion of the dielectric liquid must be designed for, resulting in additional structural volume of a liquid insulated system.

In this context, the plug-in termination of the present invention is referable to the "dry" connectors relying on solid insulation materials in all areas where field strength is high, in contrast to the "wet" connectors, essentially or supplementary relying on dielectric liquids for electrical insulation. The dry mateable connector according to the present invention is useful under all conditions where electrical contact must be established below water level, thus not exclusively in sub-sea production but also in mining, e.g., or other environments where water may be present.

A plug-in power cable termination for sub-sea use is previously known from WO 99/34495. Three single-phase conductors are jointly guided into an outer pressure-compensated housing filled with dielectric liquid, providing a first barrier towards the ambient sea water. Within the outer housing, the three conductors are separated such that each single-phase conductor is terminated in a separate, inner pressure-compensated housing filled with dielectric liquid and providing a second barrier. Each conductor is secured in the associated inner housing by the conductor end being arrested in a terminating area. The unsheathed conductor end is electrically connected within the inner housing to a conductor pin which reaches through a wall of dielectric material. The dielectric wall is mounted in the leading end of the inner housing, said wall providing the liquid and gas tight barrier between the cable termination and attached apparatus. A couple of ceramic rings are mounted in a forward end of the barrier wall, concentrically about the projecting conductor pin, and operative to increase the creeping current distance between conductor pin and ground potential in the housing.

SUMMARY OF THE INVENTION

An object of the present invention is to provide a plug-in cable termination for submerged use, having small dimensions and which is readily connectable to underwater appliances in a rational mounting procedure.

Another object is to provide a plug-in cable termination for submerged use, the assembly of which is made easy through simplified structure and reduced number of components.

Still another object is to provide a plug-in cable termination for submerged use that provides freedom in design to achieve low electrical field stress.

Yet another object is to provide a plug-in cable termination for submerged use wherein design measures result in a gas and liquid tight structure with ability to withstand mechanical forces in axial directions.

A further object of the present invention is to provide a plug-in cable termination for submerged use having reduced weight.

These and other objects are met in a plug-in cable termination.

According to the present invention, briefly, a plug-in termination of a single-phase conductor in a power cable termination assembly for submerged use has a single-phase conductor which is anchored in an insulator body insertable into a pressure-compensated housing, said insulator body form-fittingly receivable in said pressure-compensated housing under force-transmitting engagement in both axial directions. The invention specifically provides that the unsheathed conductor end is electrically connected within said insulator body to a conducting pin which is fixedly embedded by molding into said insulator body, and that the conducting pin and insulator body in surrounding relation together project from the pressure-compensated housing for electrical connection of the single-phase conductor to a current consumer/supplier.

The plug-in termination may be associated with a first barrier separating an outer pressure-compensated housing from the water; a second barrier separating an inner pressure-compensated housing from the outer pressure-compensated housing, such that the single-phase conductor runs through the first and second barriers to be anchored within said inner pressure-compensated housing.

The insulator body is produced preferably from a moldable material that solidifies about the conducting pin into a machinable element. Likewise preferred, an outer periphery of the insulator body is form-fittingly receivable in the inner housing through at least one radial shoulder mating with a corresponding radial shoulder formed on an inner periphery of the inner housing. The insulator body thus has a first diameter in a rearward section adjoining a second, smaller diameter in a forward section through a step including a radial component of direction. The shoulders, running in parallel, may be arranged so as to form a normal to the symmetry axis of the insulator body. Preferably though the shoulders are inclined from the normal towards the symmetry axis, such as inclined from the normal at an angle of about 5° to about 85°, or even within a range of 30-60°, such as at an angle of 50°+/−5° from the normal.

In one embodiment of the present invention the insulator body is produced from a moldable material that solidifies into a machinable element formed with a central cavity that tightly accommodates the cable termination components, including at least a cone clamp, contact ring, centering piece, stress cone and a pressure bolt.

In an advantageous embodiment, the insulator body is shaped in a forward end to project from the inner housing, forming a tapering cylinder about the conducting pin that substantially increases a creeping current distance between the naked end of conducting pin and ground potential, provided by the forward end of the inner housing. In a rear end, the insulator body is shaped to abut, directly or indirectly, a radial abutment projecting into the inner housing. In this connection, an axial clearance may be provided between the rear end of the insulator body and said radial abutment. Likewise, a radial clearance is advantageously provided between the insulator body and the inner housing, allowing for thermal expansion of the insulator body.

One or several sealing elements may be provided between the outer periphery of the insulator body and the inner periphery of the inner housing, the one or several sealing elements confining the dielectric liquids present at opposite ends of the insulator body.

The insulator body is advantageously produced from a thermosetting resin, such as polyepoxide (epoxy) or other insulating material with appropriate dielectric properties and mechanical strength.

In a further embodiment, the insulator body may be composed of two sections of different thermal flexibility, at least a forward one of said two sections being produced from a moldable material that solidifies into a machinable element. Specifically, a rear one of said two sections of the composed insulator body may be produced from a moldable material having higher flexibility with respect to thermal expansion, than does said forward section.

In the first embodiment of the invention, the insulator body is a homogenous solid element separating the terminate end of the single-phase conductor and conducting pin from ground potential, and in the second embodiment at least a forward section of said insulator body is a homogenous solid element separating the terminate end of the single-phase conductor and conducting pin from ground potential.

SHORT DESCRIPTION OF THE DRAWINGS

The invention is further explained below with reference to the drawings, presenting embodiments wherein the teachings of the invention are illustrated schematically. In the drawings, FIG. 1 shows in a perspective view a transformer foundation and power cable termination assembly for sub-sea use;

DETAILED DESCRIPTION OF THE INVENTION

In the following, the invention will be described by reference to non-limiting examples of a connector/plug-in termination designed for termination of a single-phase conductor in a power cable termination assembly for submerged use.

Figure 1:
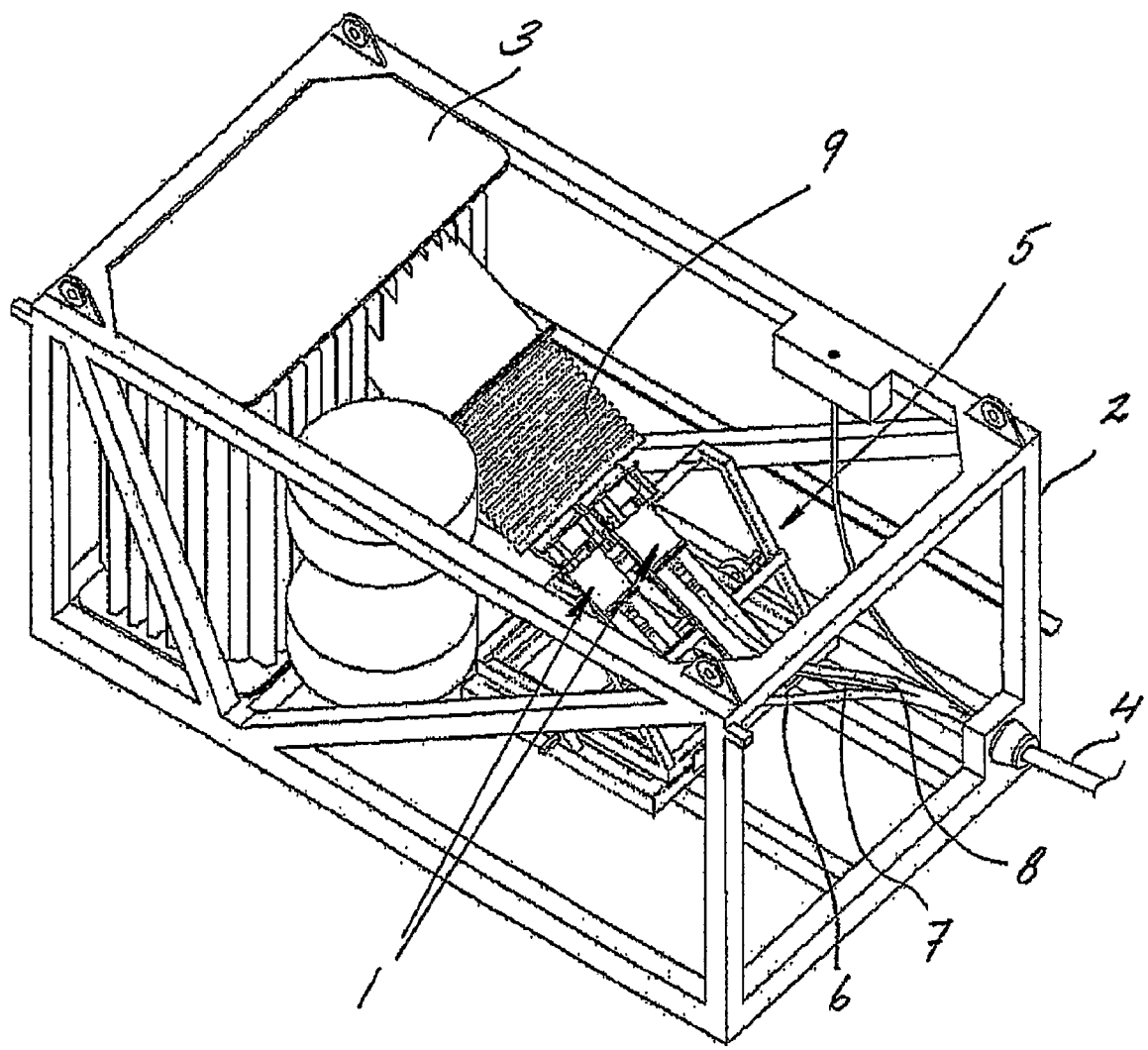

FIG. 1 shows schematically a transformer foundation 2, which is arranged to be seated on the sea-floor. The transformer foundation 2 comprises a main transformer 3 providing operational power to process control equipment controlling the underwater production of oil and gas. From a host facility based on land or sea, high voltage AC is supplied via the umbilical 4 which is terminated in a termination assembly installed on the transformer foundation 2. In the drawing, the termination assembly is generally referred to as number 5. Three single-phase conductors 6,7,8 extend from the umbilical termination for conducting power to the main transformer 3 via separate plug-in terminations 1, mating with bushings (not visible) which are installed and protected from ingress of sea water inside a connection chamber 9, filled with dielectric oil.

Figure 2:
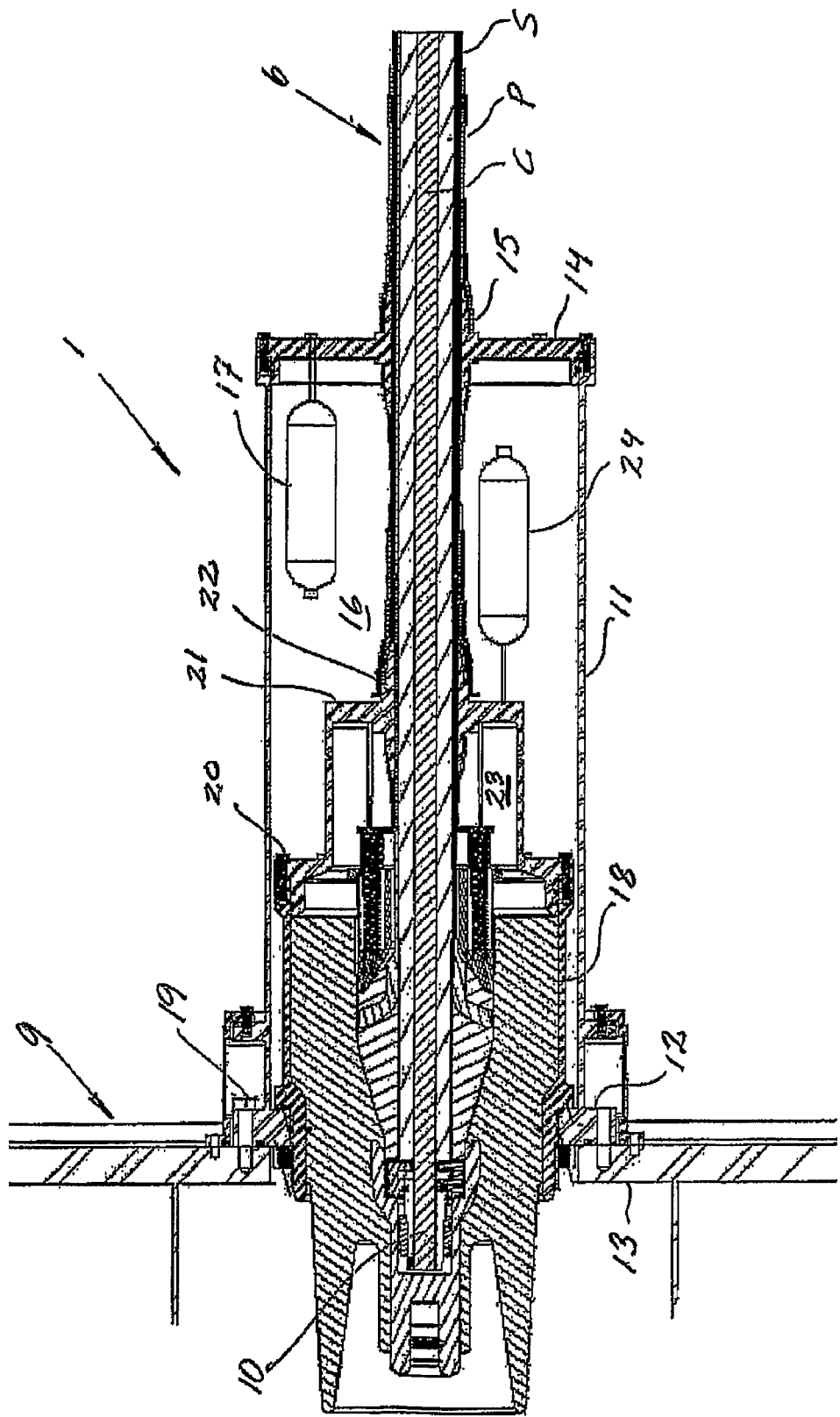
FIG. 2 shows a longitudinal section through the center of a plug-in termination according to the principles of the present invention, wherein all major components are rotation-symmetric.
Figures 3, 4:
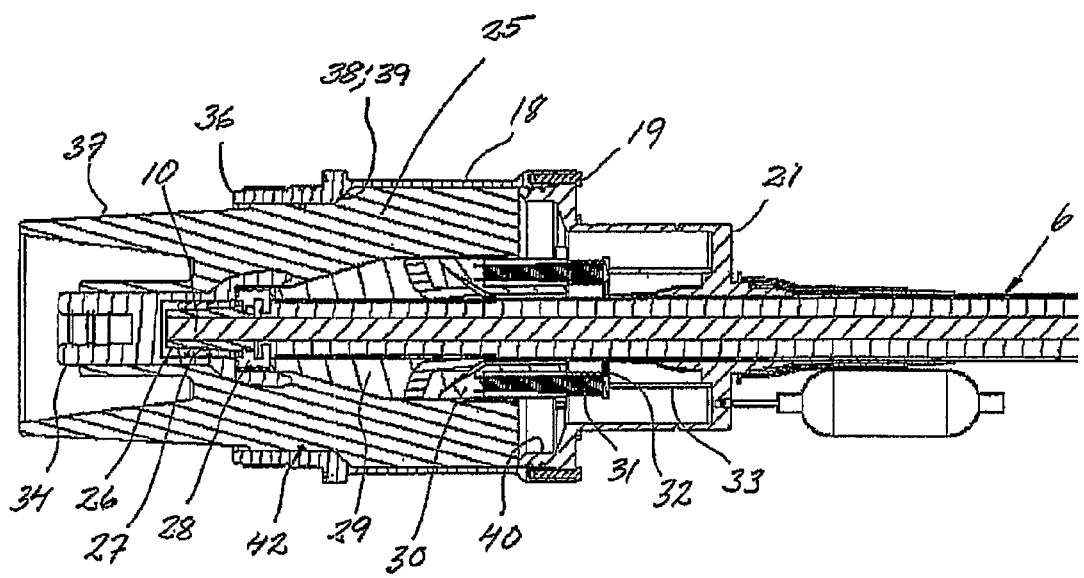
FIG. 3 shows a section similar to FIG. 2 through a first embodiment of the invention, realized in a receptacle or female connector.
FIG. 4 shows a similar section through a second embodiment of the invention, realized in a male connector.

Each single-phase conductor 6,7,8 is thus separately terminated and electrically connectable to a mating bushing inside the connection chamber, via plug-in terminations 1 according to the present invention illustrated in FIGS. 2-4.

Turning initially to FIG. 2, each single-phase conductor penetrates first and second pressure barriers effective for separating the unsheathed conductor end 10 from the sea. The first barrier is realized through an outer water-tight metal housing 11, a forward end 12 of which is sealed towards a front face 13 of the connection chamber 9. The opposite or rear end of the outer housing 11 carries an end plate 14 with a lead-through 15, through which the cable 6 (7,8) penetrates. Liquid leakage via the lead-through is prevented by sealing the insulation layer/layers of the cable towards the lead-through 15, on the exterior as well as on the interior side of the end plate 14. Sealing may be accomplished as schematically illustrated through several layers of cold- or heat-shrinkable polymer tubes and metal screens covering the entry and exit ends of the lead-through. The outer housing 11 is filled internally with dielectric liquid 16, and pressure-compensated by means of an expandable element 17, such as a metal bellows arranged internally of housing 11 and communicating with the exterior via a pipe, as illustrated.

The second barrier is realized through an inner metal housing 18, in the first embodiment of FIGS. 2 and 3 comprising a forward section bolted at 19 to the forward end 12 of the outer housing 11, and further coupled to a rear section via a bolt connection 20. The rear section forms an end plate 21 having a lead-through 22, through which the single-phase conductor penetrates into the inner housing. The lead-through 22 may be similar in structure to the lead-through 15, and similarly sealed towards ingress and bleed-out of liquid. The inner housing 18 is filled with dielectric liquid 23, and pressure-compensated by means of an expandable element 24, such as a metal bellows arranged externally of housing 18 and communicating with the housing interior via a pipe, as illustrated. Through the interacting, pressure-compensated outer and inner housings 11 and 18, respectively, a difference in pressure between the ambient sea and the liquid filled connection chamber 9 may be compensated for, over the plug-in termination 1.

The single-phase power conductor 6 is terminated in the inner housing 18, and more specifically within an insulator body 25 insertable from the rear end into the forward section of the inner housing 18 as will be explained more in detail below by reference to FIGS. 3 and 4, showing first and second embodiments, respectively, of the invention.

The insulator body 25 is an essentially solid element. As used herein, "solid" should be understood as referring to an essentially non-elastic or rigid body that maintains its original shape without being elastically deformed under the influence of external pressure, to the limit where excessive forces causes the material to disrupt. The expression is however not to be understood as excluding a degree of tenacity.

The insulator body 25 of the first embodiment is a homogenous, solid element, separating the terminate end of the single-phase conductor, as well as a conducting pin described below, from ground potential. The insulator body 25 is molded to provide a central cavity for the cable termination components, the major elements of which include a cone clamp 26 sitting on the unsheathed conductor end 10, a contact ring 27, a centering piece 28, a stress cone 29, and a pressure bolt 30 loaded by spring 31 acting between the pressure bolt and a seat 32 which is solidly abutting the forward side of the end plate 21 via a cylindrical sleeve 33. The central cavity is formed in correspondence with the exterior of the termination components, by molding and by machining, if required, so as to tightly accommodate the termination components inside the central cavity of insulator body 25 upon insertion therein, avoiding the formation of air pockets or liquid filled voids between the cavity wall and the exterior of the termination components.

Upon assembly of the plug-in termination 1, the conductor 6 and termination components 26-33 supported thereabout are inserted into the insulator body 25, whereupon the insulator body 25 and cable termination are inserted and secured within the housing 18 through tightening the bolt connection 19. Spring 31 is here operative for biasing the pressure bolt and other termination components, together with the insulator body 25, towards the forward end of inner housing 18.

Within the insulator body 25 the unsheathed end 10 of the conductor is electrically connected, via the contact ring 27, to a conducting pin 34 which is embedded in the insulator body 25. Specifically, the conducting pin 34 is molded into the insulator body 25 for complete and continuous contact with the dielectric material of insulator body 25 about the outer surface of conducting pin 34, thus in a gas and liquid tight connection with the insulator body 25. As is apparent from the drawings, the conducting pin 34 of the first embodiment is formed as a receptacle or female contact. In the embodiment of FIGS. 2 and 3, conducting pin 34 is integrally formed to include a high voltage deflector 35 that encloses the termination area, resulting in a bulgy exterior that effectively arrests the conducting pin axially in the insulator body 25.

The conducting pin 34 projects from the forward end of the insulator body 25 to accomplish mating with a contact element, housed in the connection chamber 9. More specifically, the conducting pin and insulator body together project in surrounding relation from the forward end of the pressure-compensated housing for electrical connection of the single-phase conductor to a current consumer. Thus, the plug-in termination directly mates with transformer 3 bushing, in FIG. 2 illustrated by a dash-dot line, as the plug-in termination 1 penetrates the front wall 13 of the connection chamber 9. Similarly, the forward end of the insulator body 25 projects from the forward end 36 of the inner housing 18, this end of the insulator body forming a tapering cylinder 37 about the conducting pin 34 that substantially increases a creeping current distance between the naked end of conducting pin 34 and ground potential, provided by the forward end 36 of the inner housing 18. The shape of conducting pin and projecting portion of the insulator body may vary from those illustrated, in dependence of the shape of a receiving component and connecting method, e.g., this can be a bolted connection with a cable clamp, other types of bolted connections, directly mated couplings, etc.

The insulator body 25 is producible from a dielectric material that is moldable and characterized by minimum or lack of crimping. A suitable material for molding the insulator body 25 about the conductor pin 34 is, e.g., a thermosetting resin that cures when mixed with a catalyzing agent so as to solidify about the conducting pin, such as a polyepoxide or epoxy. Without excluding suitable alternatives to the suggested, other materials having dielectric properties and comparative mechanical strength such as other suitable polymers and resins, with or without embedded reinforcements, or even ceramics, e.g., may be used, bearing in mind that materials which are suitable for machining are preferred. Producing the insulator body from dielectric materials suitable for molding and machining as suggested by the present invention provides the dual advantages of a gas- and liquid tight embedding of the conducting pin as well as freedom in design to achieve low electrical field stress and controllable tolerances in interface geometries.

The insulator body 25 is shaped externally to be form-fittingly received in the forward section of inner housing 18, in force transmitting engagement in axial directions. In other words, the insulator body 25 and housing 18 are shaped in cooperation to withstand axial forces applied to the insulator body 25, such as axial forces caused by differential pressures, without dislocating the insulator body 25 from its position in the inner housing 18. To achieve this the inner housing 18 and insulator body 25 are both correspondingly formed with at least one radial shoulder that is operative for absorbing an axial force applied in a forward direction. In other words, the insulator body 25 has a first diameter in a rearward section adjoining a second, smaller diameter in a forward section through a step including a radial component of direction. Each one of the rearward and forward sections on opposite sides of the radial step may be formed either as a straight cylinder or they may be shaped as a truncated cone, as illustrated. More precisely, a radial shoulder 38 formed externally on the insulator body 25 abuts in mounted position a corresponding radial shoulder 39 formed internally on the housing 18. The shoulders 38 and 39 run in parallel about the outer and inner peripheries, respectively, of the insulator body and housing. The shoulders 38, 39 may be arranged so as to form a normal N to a symmetry axis of the insulator body. Preferably though the shoulders are inclined from the normal N towards the symmetry axis, this way distributing applied forces over a larger area and dividing a total axial force into partial tension and compression forces. The shoulders 38, 39 may thus be inclined from the normal at an angle α of about 5 to about 85°, or even within a range of 30-60° from the normal. An inclination a from the normal of 50°+/−5° as illustrated is believed to be desirable, however not unconditional for practice of the invention.

Axial forces acting in the opposite direction, i.e. towards the rear or right-hand side of plug-in termination 1 as illustrated, are absorbed directly or indirectly by the rear section or end plate 21. A forward end of a flange 40 on the end plate projects longitudinally into the front section of inner housing 18, providing a radial abutment for the rear end of insulator body 25. Alternatively, and shown in FIG. 4, a metal or plastic sleeve 41 may be supplementary inserted between the radial abutment and that rear end of the insulator body. Appropriately, though not readily apparent from the drawings, the insulator body 25 may be dimensioned to have an axial length that allows for axial thermal expansion of the insulator body in an axial clearance formed between the radial abutment on flange 40, or the inserted sleeve 41 if appropriate, and the rear end of the insulator body 25. Likewise, a radial clearance may be formed between the outer periphery of the insulator body and the inner periphery of the inner housing, allowing for thermal expansion of the insulator body in a radial direction.

Sealing elements, such as O-seals, are appropriately applied for sealing bolted connections and contact surfaces according to requirements familiar to a person skilled in the art. In this connection attention is drawn to the ring-seal 42, seated in a peripheral groove formed by molding or machining so as to run about the periphery of the insulator body 25. The ring-seal 42 seals against the inner periphery of inner housing 18, effectively confining the dielectric liquids present at opposite ends of the insulator body. If appropriate, sealing elements such as the ring-seal 42, or similar, may be applied in plural. Alternatively, the ring-seal 42 may be seated in a groove formed internally on the inner metal housing 18.

A second embodiment of the plug-in termination according to the present invention will be explained below by reference to FIG. 4 of the drawings. In FIG. 4, elements of the second embodiment that provide the operation of corresponding elements of the embodiment of FIG. 3 are denominated by the same reference numbers. Thus, in all essentials the two embodiments are similar in structure and operation, albeit different load ratings and insulation requirements result in different geometrical design between the two embodiments, the first embodiment being designed for high voltage supply and the second embodiment designed for medium voltage supply. A notable difference is however observed with respect to the structure of the insulator body.

In the second embodiment, here illustrated by a male connector, the insulator body 25' is composed of two moldable dielectric materials of different properties with respect to thermal expansion. A forward section of insulator body 25' is molded about the conducting pin 34' from a first material that solidifies into an essentially solid, machinable element as explained above. The forward section adjoins a rear section 25" that is molded onto the conducting pin and high voltage deflector 35' from a second material that solidifies into an element of higher flexibility in terms of thermal expansion, than said first material. Thermal expansion of the rear section 25" is absorbed in axial direction through a spring member 43, acting between the end plate 21 and a ring-shaped seat 44 supporting the rear end of the insulator body rear section 25". Notable also in the second embodiment, the high voltage deflector 35' is non-integrated in the conductor pin 34', the latter still due to a non-linear exterior axially fixated in the insulator body.

Consistently with the first embodiment, the insulator body 25' is arrested axially in the housing, on one hand through abutting radial shoulders 38 and 39 on the insulator body exterior and the housing interior, respectively, and on the other hand by the rear end of the insulator body 25' abutting the sleeve 41 which is supported from the radial abutment that is formed on the flange 40. Clearances for axial and/or radial expansion of the insulator body may be provided for in accordance with the first embodiment.

The rear end of insulator body forward section has a skirt 45 that concentrically encloses a forward end of the insulator body rear section 25". The skirt 45 provides an increase of the contact area between the forward and rear insulator body sections, through which heat may be conducted from the forward section. The skirt 45 is likewise operative for mechanically protecting the rear section, in a case where the latter is produced from a material of lesser hardness than the forwards section, Additionally the skirt 45 increases a creeping current distance between high voltage conducting parts and ground potential.

Also consistently with the first embodiment, the insulator body 25' at least with respect to said first section is a homogenous, solid element effective for separating the terminate end 10 of the single-phase conductor and conducting pin 34' from ground potential. Additionally, similar to the first embodiment, the conducting pin 34' and insulator body 25' project together from the pressure-compensated housing in surrounding relation for electrical connection of the single-phase conductor to a current consumer/supplier.

The illustrated first and second embodiments, though originally designed for conducting voltages of 145 kV and 36 kV, respectively, are adaptable to other ratings by modifications that from the teachings herein would be obvious for a person skilled in the art. The disclosed plug-in termination provides low electrical field stress at operational load currents in a compact and lightweight design of a dry connector, wherein solid insulation materials are applied in all areas where electrical field stress is high, which is an important and central feature of the invention. Another important feature is the multiple function of the insulator body, designed to establish electrical contact and to provide a pressure barrier within one single element. Still another important and central feature is the provision of a moldable material that solidifies about the conductor pin into a component which is readily machinable, allowing the insulator body to be produced at minimum tolerances. A further advantageous feature is the provision of a form-fitting insulator body wherein design measures are included for absorbing axial forces.

It will be appreciated by the skilled person that these and other features recited above and in appended claims may be applied separately and will each beneficially add to the improvement of dry plug-in cable terminations for sub-sea use. It is likewise appreciated that these features, when applied in combination, result in the best mode of operation as illustrated by the embodiments disclosed in text and drawings. Notwithstanding the fact that the invention has been described in connection with the supply of power to current consumers, it will be appreciated that the plug-in termination disclosed above likewise is useful for establishing connection with a power source. It is likewise to be understood, that any reference above and in claims to sub-sea production equally applies to any other submerged application where electricity is to be conducted below water level.

The invention claimed is:

1. A plug-in termination of a single-phase conductor in a power cable termination assembly for submerged use, wherein the single-phase conductor is anchored in an insulator body insertable into a pressure-compensated housing, said insulator body form-fittingly receivable in said pressure-compensated housing under force-transmitting engagement in axial directions, wherein an unsheathed conductor end is electrically connected within said insulator body to a conducting pin which is fixedly embedded by molding into said insulator body, and wherein the conducting pin and insulator body in surrounding relation together project from the pressure-compensated housing for electrical connection of the single-phase conductor to a current consumer/supplier.

2. The plug-in termination according to claim 1, further comprising:
a first barrier separating an outer pressure-compensated housing from surrounding water; and
a second barrier separating an inner pressure-compensated housing from the outer pressure-compensated housing, wherein the single-phase conductor runs through the first and second barriers to be anchored within said inner pressure-compensated housing.

3. The plug-in termination according to claim 1, wherein the insulator body is produced from a moldable material that solidifies about the conducting pin into a machinable element.

4. The plug-in termination according to claim 1, wherein the insulator body has a first diameter in a rearward section adjoining a second, smaller diameter in a forward section through a step including a radial component of direction.

5. The plug-in termination according to claim 4, wherein an outer periphery of the insulator body is receivable in the inner housing under force-transmitting engagement in axial direction through a radial shoulder, mating with a radial shoulder formed in an inner periphery of the housing.

6. The plug-in termination according to claim 5, wherein the shoulders are inclined from a normal to a symmetry axis of the insulator body.

7. The plug-in termination according to claim 6, wherein the shoulders are inclined at an angle of 5-85° from a normal to the symmetry axis of the insulator body.

8. The plug-in termination according to claim 3, wherein the insulator body is produced from a moldable material that solidifies into a machinable element formed with a central cavity that tightly accommodates the cable termination components, including at least cone clamp, contact ring, centering piece, stress cone and pressure bolt.

9. The plug-in termination according to claim 1, wherein the insulator body in a forward end is formed with a tapering cylinder about the conducting pin that substantially increases a creeping current distance between a naked end of conducting pin and ground potential, provided by a forward end of the pressure-compensated housing.

10. The plug-in termination according to claim 1, wherein the insulator body is shaped in a rear end to abut, directly or indirectly, a radial abutment projecting into the inner housing from an end plate thereof.

11. The plug-in termination according to claim 1, wherein an axial clearance is provided between the rear end of the insulator body and a radial abutment projecting into the inner housing from an end plate thereof.

12. The plug-in termination according to claim 1, wherein a radial clearance is provided between the insulator body and the pressure-compensated housing.

13. The plug-in termination according to claim 1, wherein at least one sealing element between the outer periphery of the insulator body and the inner periphery of the pressure-compensated housing confines the dielectric liquids present at opposite ends of the insulator body.

14. The plug-in termination according to claim 1, wherein the insulator body is produced from a thermosetting resin.

15. The plug-in termination according to claim 14, wherein the insulator body is produced from polyepoxide.

16. The plug-in termination according to claim 1, wherein the insulator body comprises two sections of differing thermal flexibility, at least a forward one of said two sections being produced from a moldable material that solidifies into a machinable element.

17. The plug-in termination according to claim 16, wherein a rear one of said two sections of the composed insulator body is produced from a moldable material having higher thermal flexibility, than does said forward section.

18. The plug-in termination according to claim 1, wherein the insulator body comprises a homogenous solid element separating the terminate end of the single-phase conductor and conducting pin from ground potential.

19. The plug-in termination according to claim 16, wherein at least a forward section of said insulator body comprises a homogenous solid element separating the terminate end of the single-phase conductor and conducting pin from ground potential.

20. The plug-in termination according to claim 6, wherein the shoulders are inclined at an angle of 30-60° from a normal to the symmetry axis of the insulator body.

21. The plug-in termination according to claim 6, wherein the shoulders are inclined at an angle $\alpha$ of 50°+/−5° from a normal to the symmetry axis of the insulator body.

* * * * *